US009073674B2

(12) United States Patent
Deng

(10) Patent No.: US 9,073,674 B2
(45) Date of Patent: *Jul. 7, 2015

(54) MULTILAYER SEALANT FILM

(71) Applicant: DuPont Teijin Films U.S. Limited Partnership, Chester, VA (US)

(72) Inventor: Fenghua Deng, Richmond, VA (US)

(73) Assignee: DUPONT TEIJIN FILMS U.S. LIMITED PARTNERSHIP, Chester, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/955,277

(22) Filed: Jul. 31, 2013

(65) Prior Publication Data

US 2013/0313260 A1    Nov. 28, 2013

Related U.S. Application Data

(63) Continuation of application No. 12/373,637, filed as application No. PCT/US2007/015800 on Jul. 11, 2007, now Pat. No. 8,507,084.

(60) Provisional application No. 60/831,016, filed on Jul. 14, 2006.

(51) Int. Cl.
| | |
|---|---|
| B32B 7/12 | (2006.01) |
| B32B 27/08 | (2006.01) |
| B32B 27/18 | (2006.01) |
| B32B 27/36 | (2006.01) |
| B32B 37/12 | (2006.01) |
| B65D 77/20 | (2006.01) |
| B05D 1/36 | (2006.01) |
| B05D 3/02 | (2006.01) |
| C08G 63/08 | (2006.01) |
| C08G 63/127 | (2006.01) |
| C08G 63/13 | (2006.01) |
| C08G 63/183 | (2006.01) |
| C08G 63/189 | (2006.01) |
| C08L 67/02 | (2006.01) |
| C08L 67/04 | (2006.01) |
| C09D 167/02 | (2006.01) |
| C09D 167/04 | (2006.01) |
| C09J 167/02 | (2006.01) |
| C09J 167/04 | (2006.01) |
| B65D 53/00 | (2006.01) |
| C08J 7/04 | (2006.01) |
| C08K 5/00 | (2006.01) |

(Continued)

(52) U.S. Cl.
CPC .......... B65D 53/00 (2013.01); *Y10T 428/2813* (2015.01); *Y10T 428/265* (2015.01); *Y10T 428/2826* (2015.01); *Y10T 428/263* (2015.01); *Y10T 428/269* (2015.01); *Y10T 428/2817* (2015.01); *C08G 63/183* (2013.01); *C08G 63/127* (2013.01); *C08G 63/08* (2013.01); *C08G 63/13* (2013.01); *C08G 63/189* (2013.01); *C08K 5/005* (2013.01); *C08L 2205/02* (2013.01); *C08K 3/0041* (2013.01); *C08L 2203/162* (2013.01); *C08K 3/0033* (2013.01); *B32B 7/12* (2013.01); *B32B 27/08* (2013.01); *B32B 37/12* (2013.01); *B32B 37/1284* (2013.01); *B32B 37/0038* (2013.01); *B32B 27/18* (2013.01); *B65D 77/2024* (2013.01); *B32B 2255/26* (2013.01); *B32B 2255/28* (2013.01); *B32B 2307/31* (2013.01); *B05D 2508/00* (2013.01); *B32B 2367/00* (2013.01); *B32B 2307/716* (2013.01); *B32B 2307/518* (2013.01); *B32B 2250/244* (2013.01); *B05D 1/36* (2013.01); *C09J 167/02* (2013.01); *C09J 167/04* (2013.01); *B32B 2439/40* (2013.01); *B05D 3/02* (2013.01); B32B 27/36 (2013.01); C08J 7/047 (2013.01); *C08J 2367/02* (2013.01); *C08J 2467/00* (2013.01); C08L 67/02 (2013.01); C08L 67/04 (2013.01); *C09D 167/02* (2013.01); *C09D 167/04* (2013.01)

(58) Field of Classification Search
None
See application file for complete search history.

(56) References Cited

U.S. PATENT DOCUMENTS

| | | | |
|---|---|---|---|
| 3,669,921 A | 6/1972 | Droke et al. | |
| 4,066,820 A | 1/1978 | Kelly et al. | |

(Continued)

FOREIGN PATENT DOCUMENTS

| | | |
|---|---|---|
| EP | 1 685 954 | 8/2006 |
| EP | 1 839 849 | 10/2007 |

(Continued)

OTHER PUBLICATIONS

Hasegawa, Daisuke, Notice of Reasons for Rejection dated Jan. 29, 2013, for Japanese Application No. 2009-520763.

(Continued)

*Primary Examiner* — Vivian Chen
(74) *Attorney, Agent, or Firm* — RatnerPrestia

(57) ABSTRACT

A multilayer film suitable for sealing containers such as used for food packaging, and methods of making the film, are described. The film is particularly suitable for sealing containers made from polylactic acid (PLA). The multilayer film includes:
  a) a substrate that includes a polymeric base layer; and
  b) on the substrate, a heatseal layer containing a PLA homopolymer or copolymer.
The heatseal layer further includes dispersed therein an adhesion promoter, or alternatively the substrate further includes the adhesion promoter in a layer on a surface of the polymeric base layer between and adjacent the base layer and the heatseal layer. An antifog agent may also be included in the heatseal layer or on the surface of the heatseal layer opposite the substrate.

26 Claims, No Drawings

(51) Int. Cl.
*C08K 3/00* (2006.01)
*B32B 37/00* (2006.01)

(56) References Cited

U.S. PATENT DOCUMENTS

| | | | |
|---|---|---|---|
| 4,156,702 A | 5/1979 | Edinger | |
| 4,341,825 A | 7/1982 | Kemski | |
| 4,362,775 A | 12/1982 | Yabe et al. | |
| 4,755,337 A * | 7/1988 | Takahashi et al. | 264/134 |
| 4,888,381 A * | 12/1989 | Pankratz | 524/751 |
| 4,966,959 A * | 10/1990 | Cox et al. | 528/272 |
| 5,059,470 A | 10/1991 | Fukuda et al. | |
| 5,073,435 A | 12/1991 | Eyraud et al. | |
| 5,209,972 A * | 5/1993 | Super et al. | 428/349 |
| 5,216,050 A * | 6/1993 | Sinclair | 524/108 |
| 5,888,599 A | 3/1999 | Bradt | |
| 6,106,950 A | 8/2000 | Searle et al. | |
| 6,114,021 A | 9/2000 | Pankratz et al. | |
| 6,153,276 A | 11/2000 | Oya et al. | |
| 6,307,003 B1 | 10/2001 | Grigat et al. | |
| 6,485,819 B2 * | 11/2002 | Hayes | 428/221 |
| 6,521,336 B2 | 2/2003 | Narita et al. | |
| 6,623,821 B1 * | 9/2003 | Kendig | 428/34.9 |
| 6,649,732 B2 | 11/2003 | Kobayashi et al. | |
| 6,706,389 B1 * | 3/2004 | Bates et al. | 428/349 |
| 6,716,911 B2 | 4/2004 | Doi et al. | |
| 6,727,342 B1 | 4/2004 | Bastioli et al. | |
| 6,787,245 B1 * | 9/2004 | Hayes | 428/480 |
| 6,939,584 B2 | 9/2005 | Sankey et al. | |
| 6,960,374 B1 | 11/2005 | Terada et al. | |
| 7,087,313 B2 | 8/2006 | Sawai et al. | |
| 7,132,490 B2 * | 11/2006 | Obuchi et al. | 526/317.1 |
| 7,267,858 B2 | 9/2007 | Ono et al. | |
| 7,285,318 B2 | 10/2007 | Kaku et al. | |
| 7,320,773 B2 | 1/2008 | Egawa | |
| 7,368,160 B2 | 5/2008 | Inglis | |
| 7,393,590 B2 * | 7/2008 | Scheer et al. | 428/480 |
| 7,422,782 B2 | 9/2008 | Haedt et al. | |
| 7,666,941 B2 | 2/2010 | Shiba et al. | |
| 7,901,764 B2 | 3/2011 | Takase et al. | |
| 8,507,084 B2 * | 8/2013 | Deng | 428/336 |
| 2002/0065345 A1 * | 5/2002 | Narita et al. | 524/271 |
| 2004/0067284 A1 * | 4/2004 | Sankey et al. | 426/106 |
| 2006/0019111 A1 | 1/2006 | Sawai et al. | |

FOREIGN PATENT DOCUMENTS

| | | | |
|---|---|---|---|
| JP | 2003-80655 | | 3/2003 |
| JP | 2003-082319 | | 3/2003 |
| JP | 2003-113344 | * | 4/2003 |
| JP | 2003-301095 | | 10/2003 |
| JP | 2004-098321 | * | 4/2004 |
| JP | 2004-518007 | | 6/2004 |
| JP | 2005-2201 | | 1/2005 |
| JP | 2005-15746 | | 1/2005 |
| JP | 2006-15723 | | 1/2006 |
| JP | 2006-103751 | | 4/2006 |
| JP | 2006-181754 | | 7/2006 |
| JP | 2008-87180 | | 4/2008 |
| WO | WO 02/059186 | | 8/2002 |
| WO | WO 2004/076583 | | 9/2004 |
| WO | WO 2007/113077 | | 10/2007 |
| WO | WO 2007/134080 | | 11/2007 |
| WO | WO 2007/135037 | | 11/2007 |
| WO | WO 2008/008381 | | 1/2008 |

OTHER PUBLICATIONS

Iannace, S., et al.; "Poly(3-hydroxybutyrate)-co-(3-hydroxyvalerate)/Poly-L-Lactide Blends: Thermal and Mechanical Properties"; Journal of App. Polymer Science; vol. 54 (1994); pp. 1525-1536; Dec. 1994, No. 10, New York, NY.

* cited by examiner

MULTILAYER SEALANT FILM

This application is a continuation of U.S. application Ser. No. 12/373,637, filed Jan. 13, 2009, which is the National Stage entry of International Application No. PCT/US2007/015800, filed Jul. 11, 2007, and claims priority of U.S. Provisional Patent Application No. 60/831,016, filed Jul. 14, 2006, the entirety of which applications are incorporated herein by reference.

BACKGROUND OF THE INVENTION

Polylactic acid (PLA) is a highly biodegradable polymer that may be derived from natural sources, such as corn. The use of PLA for making food packaging trays is increasingly popular, due at least in part to its easy biodegradability and the fact that trays made from it have very high oxygen and moisture permeation rates and are therefore well suited for packaging fresh produce. However, trays made from PLA tend to soften and deform at temperature as low as 104° F. (40° C.). Because of this drawback, a critical requirement for lidding films for use on PLA trays is that the heatseal must be formed at a low temperature (around 200° F., or 93° C.) with a short dwell time (less than 2 seconds). Conventional sealant films either do not heat seal to PLA trays at low enough temperatures, or the heatseal strength deteriorates over time after the seal is made. Coextruded PLA films having one amorphous PLA layer and one crystalline PLA layer are capable of being sealed to PLA trays at low temperature, but such films are typically very brittle and tear easily, and do not run well on packaging lines, especially at high speeds. As indicated by the above, it would be beneficial to provide a lidding film that meets both the sealing performance requirements for use on PLA trays and the film processability performance required for practical commercial use.

SUMMARY OF THE INVENTION

In one aspect, the invention provides a multilayer film including
  a) a substrate including a polymeric base layer; and
  b) on the substrate, a heatseal layer including a PLA polymer. The heatseal layer further includes dispersed therein an adhesion promoter, or the substrate further includes an adhesion promoter in a layer on a surface of the polymeric base layer between and adjacent the polymeric base layer and the heatseal layer.

In another aspect, the invention provides a sealed container including a vessel having an opening, wherein the opening is sealed with a multilayer film as described immediately above on the side of the film bearing the heatseal layer.

In yet another aspect, the invention provides a method of making a multilayer film. The method includes
  a) applying a coating liquid to a substrate including a polymeric base layer, the coating liquid including a solvent and a PLA polymer, wherein either the coating liquid further includes an adhesion promoter or the substrate further includes an adhesion promoter in a layer on a surface of the polymeric base layer to receive the coating liquid; and
  b) removing the solvent to form a heatseal layer including the PLA polymer.

In a further aspect, the invention provides a coating composition including a PLA polymer, a copolyester, and a solvent.

DETAILED DESCRIPTION OF THE INVENTION

The inventor has found that suitably strong adhesion of PLA polymers to polyethylene terephthalate (PET) and many other substrates is very difficult to achieve, using methods known prior to the present invention. To address this and other issues, multilayer films according to the invention include a substrate comprising a polymeric base layer, and, on the substrate, a heatseal layer comprising a PLA polymer. One or both of the heatseal layer and the substrate further comprises an adhesion promoter that increases the adhesion between the PLA polymer and the polymeric base layer, while maintaining good low temperature heatseal characteristics. Unless otherwise indicated, the term "PLA polymer" as used herein includes homopolymers of lactic acid and copolymers of lactic acid comprising at least 30 mol % lactic acid repeat units. If the substrate comprises the adhesion promoter as a layer, that layer may be formed in-line during the polymeric base layer manufacturing process or off-line after the polymeric base layer is made. Generally, a polymeric material that will be used in a heatseal layer (i.e., a "heat sealable" polymer) will be a thermoplastic polymer having a softening temperature at least 50° F. lower than that of the polymeric base layer, typically at least 100° F. lower, and more typically at least 150° F. lower. The softening point is preferably above 75° F.

If the adhesion promoter is dispersed in the heatseal layer, the dispersion may take the form of a homogenous solution or the heatseal layer may comprise a dispersed polymeric phase and a continuous polymeric phase having a different composition. In some embodiments, the adhesion promoter constitutes more than 50 wt % of one of said phases and the PLA polymer constitutes more than 50 wt % of the other of said phases. The adhesion promoter may be dispersed in the PLA polymer or vice versa. The presence of a hazy appearance in the heatseal layer of some embodiments of the invention is believed to indicate the presence of polymeric phases of different composition. One exemplary formulation that provides such an appearance, and good heatseal performance, after drying on the substrate consists of 30% of an amorphous PLA polymer (PLA 4060D, a D,L-polylactic acid polymer purchased from NatureWorks LLC of Minnetonka, Minn.), and 70% of a copolyester (azelaic acid/terephthalic acid/ethylene glycol, 45/55/100 mol equivalents).

The inventor has found that, by carefully selecting the adhesion promoter, it is possible to make multilayer films that can be sealed to PLA items such as trays at temperatures low enough that the PLA is not distorted while providing good adhesion between the PLA polymer layer and the substrate. Moreover, due at least partially to the presence of a mechanically strong polymeric base layer, these films typically show excellent processability on packaging lines.

Multilayer films of any thickness may be used according to the invention. Typically, the polymeric base layer may be in a range from 12 to 120 microns thick. The heatseal layer will typically be in a range of 0.5 to 20 microns thick, more typically 2.0 to 10 microns thick. These relatively thin heatseal layers may typically be produced by solution coating, and may be difficult to achieve by other processes such as extrusion coating or coextrusion coating. One drawback of extrusion-processing PLA polymers is the need to pre-dry the polymer to prevent thermal degradation. This extra step may be eliminated when the PLA polymer is applied by solution coating under typical conditions, i.e., at a processing temperature below the thermal degradation temperature of the PLA polymer. If there is a separate adhesion promoting layer between the PLA polymer and the polymeric base layer, it will typically be in a range from 0.02 to 5 microns thick.

If the heatseal layer includes an adhesion promoter dissolved or otherwise dispersed in it, the amount of adhesion promoter will typically be at least 1 wt %, more typically at least 10 wt %, and most typically at least 20 wt % or even at least 30 wt % of the combined weight of promoter and PLA polymer. The amount will typically be at most 90 wt %, more typically at most 70 wt %, and most typically at most 40 wt %. In those embodiments of the invention in which the heatseal layer is desired to be relatively clear (non-hazy), the relative amount of adhesion promoter vs. PLA polymer may suitably be somewhat lower. For example, the amount of adhesion promoter may typically be at least 20 wt %, more typically at least 30 wt %, and most typically about 40 wt % of the combined weight of promoter and PLA polymer. The amount will typically be at most 60 wt %, more typically at most 50 wt %. In those cases where it is desired to prevent the formation of moisture droplets on the surface of the film when used in an environment that encourages such formation (such as packaging of refrigerated foods), an antifog agent may also be used, as described further below. The components that make up the multilayer film will now be discussed in detail, followed by a description of how the films may be made and some typical uses of the films.

Heatseal Layer

The heatseal layer includes at least one PLA polymer. Suitable types of PLA polymers for use according to the invention may be any variety known in the art, and may include lactic acid homopolymers and copolymers. Suitable comonomers include those according to the formula HOC($R^1$)($R^2$)($CH_2$)$_n$COOH, where $R^1$ and $R^2$ are each individually H or a substituted or unsubstituted $C_1$-$C_5$ group, and n is an integer from 0 to 10. The PLA polymer may be amorphous (i.e., at least 90% amorphous by Differential Scanning calorimetry), or it may have substantial crystallinity. Typically, it will be at most 50% crystalline, and more typically at most 20% crystalline. The PLA polymer may be a lactic acid homopolymer, which may be one or more of the following morphologically distinct polymers: D-polylactic acid, L-polylactic acid, D,L-polylactic acid, and meso-polylactic acid. D-polylactic acid and L-polylactic acid are polymers of the corresponding pure enantiomeric acids, and are optically active polymers. D,L-polylactic acid is made from racemic lactic acid, i.e., a copolymer of D-polylactic acid and L-polylactic acid having a well-defined conformation of D- and L-polylactic acid units. Meso-polylactic acid is a random copolymer of equimolar D-lactic and L-lactic acid. It is known that the morphology of PLA homopolymer is governed by the ratio of D isomer to L isomer in the polymer backbone. Typically, the higher the D-lactic acid content, the less crystalline the polymer is.

Any of the known polymerization methods, such as polycondensation and ring-opening polymerization, can be adopted for polymerization of lactic acid. In the polycondensation method, for example, L-lactic acid, D-lactic acid or a mixture of these is directly subjected to dehydropolycondensation by means known in the art. In the ring-opening polymerization method, a lactide (i.e., a cyclic dimer of lactic acid) is subjected to polymerization in the presence of a catalyst to form polylactic acid. The lactide may be a dimer of L-lactic acid, a dimer of D-lactic acid, or a mixed dimer of L-lactic acid and D-lactic acid. These isomers can be mixed and polymerized to obtain polylactic acid having any desired composition and crystallinity.

A small amount of a chain-extending agent, for example, a diisocyanate compound, an epoxy compound or an acid anhydride, may be used to increase the molecular weight of the PLA polymer. The polymer may be in any molecular weight range, but usually the weight average molecular weight will be within a range of 60,000-1,000,000 daltons. Typically, if the molecular weight is less than 60,000, suitable physical properties may not be obtained. On the other hand, if the molecular weight is more than 1,000,000, the melt viscosity may be excessively high, resulting in poor moldability.

The PLA polymer may also be a copolymer of lactic acid with one or more comonomers. Such comonomers, if present, will in total constitute less than 50 mol %, typically less than 30 mol %, and more typically less than 10 mol % of the PLA polymer. Examples of such comonomers include caprolactone; hydroxycarboxylic acids such as glycolic acid, 3-hydroxybutyric acid, 4-hydroxybutyric acid, 4-hydroxyvaleric acid and 6-hydroxycaproic acid; polyols such as ethylene glycol, propylene glycol, butanediol, neopentyl glycol, poly(ethylene glycol)s, glycerol and pentaerythritol; and polyacids such as succinic acid, adipic acid, sebacic acid, fumaric acid, terephthalic acid, isophthalic acid, 2,6-naphthalenedicarboxylic acid, 5-sodiosulfoisophthalic acid and 5-tetrabutylphosphonium sulfoisophthalate. In some embodiments of the invention, it is preferred that the comonomer (if any) be biodegradable.

In some embodiments of the invention, the film includes an antifog agent to reduce or eliminate the formation of fogging of the interior surface of the film due to the formation of water droplets. The antifog agent is dispersed within the heatseal layer and/or resides on a surface of the heatseal layer opposite the substrate. In some embodiments, the antifog agent may be part of the formulation that is used to form the heatseal layer, and it may remain largely dispersed in that layer or it may bloom to the surface. Alternatively, it may be applied directly to the surface of the heatseal layer by dipping, spraying, or otherwise coating, typically from a suitable solvent. Examples of suitable antifog agents include alkoxylated fatty ethers, e.g. ATMER®502, sorbitan esters, e.g. ATMER® 103, other known nonionic, anionic and cationic surface active agents, e.g., polyoxyalkylene fatty acid esters, alkoxylated phenols, mixed mono-, di-, or triglycerides, fatty acid esters of polyhydroxy alcohols, other polyalkoxylated compounds and the like. The ATMER® products are available from Ciba Specialty Chemicals Corp. of Tarrytown, N.Y. If included in the heatseal layer, the antifog agent will typically constitute from about 0.1 wt % to about 15 wt % of the layer, more typically about 0.5 wt % to about 10 wt %. If applied directly to the surface of the heatseal layer, the amount will typically be in a range of about 0.1 wt % to about 5 wt %, and more typically from about 0.1 wt % to about 1 wt %, relative to the weight of the heatseal layer.

The heatseal layer may include inorganic particles, such as for example silica, and/or slip additives such as for example wax and/or polytetrafluoroethylene dispersions. Antioxidants may also be included in some applications. In some embodiments, the heatseal layer may be free of plasticizers (e.g., polyglycols or polyethers, or esters of these), tackifiers, and/or inorganic fillers. The heatseal layer may also, in some embodiments, be free of aliphatic polyesters other than the PLA polymer.

Adhesion Promoter

As used herein, the term "adhesion promoter" means a material that, when added to the PLA polymer in the heatseal layer or when used as an intermediate layer between the heatseal layer and the polymeric base layer, provides a heatseal a strength of at least 200 g/in when tested according to method (ii) in the Examples section. Typically the strength will be at least 300 g/in, and more typically at least 400 g/in. Preferably, the adhesion promoter provides cohesive failure mode where, when separating the films according to method (ii), the heatseal layer stays with the respective polymeric base layer and the separation is within the fused heatseal layers. Suitable adhesion promoters include but are not limited to ethylene copolymers such as EVA (ethylene-vinyl acetate) and EMA (ethylene-methyl acrylate), and tackifier resins such as rosin esters.

In some embodiments, the adhesion promoter comprises a copolyester resin. As used herein, the term "copolyester" means a polyester derived from at least one (and preferably only one) aromatic dicarboxylic acid and at least one (and preferably only one) aliphatic dicarboxylic acid or a lower alkyl (i.e. up to 14 carbon atoms) diester thereof, with one or more glycols. Formation of the copolyester is conveniently effected by known methods of condensation or ester interchange, at temperatures generally up to about 275° C. Exemplary aromatic dicarboxylic acids include terephthalic acid, isophthalic acid, phthalic acid, and 2,5-, 2,6- or 2,7-naphthalenedicarboxylic acid. Exemplary aliphatic dicarboxylic acids are saturated aliphatic dicarboxylic acids of the general formula $C_nH_{2n}(COOH)_2$ wherein n is 2 to 8, such as succinic acid, sebacic acid, adipic acid, azelaic acid, suberic acid or pimelic acid, preferably sebacic acid, adipic acid and azelaic acid, and more preferably azelaic acid.

In some embodiments, the polyester contains no more than 90% of aromatic dicarboxylic acid (such as terephthalic acid) and at least 10% of aliphatic dicarboxylic acid, the percentages being the mole percentage of the total diacid content of the polyester. Typically, the concentration of the aromatic dicarboxylic acid is at least 55 mole %, and may be 60 mole % or more. It is typically no more than about 80 mole %, and more typically no greater than 70 mole %, and most typically not greater than 65 mole % based on the dicarboxylic acid components of the copolyester. The concentration of the aliphatic dicarboxylic acid in the copolyester is typically at least 20 mole %, and more typically at least 35 mole %, but will typically be at most 45 mole % based on the dicarboxylic acid components of the copolyester. When expressed on a weight basis, the relative amounts of aromatic and aliphatic dicarboxylic acid will depend somewhat upon the molecular weights of each, but there will typically be at least 55 percent aromatic diacid and at most 45% aliphatic diacid by weight.

Suitable glycols include aliphatic glycols, such as alkylene glycols. Thus, suitable glycols include aliphatic diols such as ethylene glycol, diethylene glycol, triethylene glycol, propylene glycol, 1,3-butanediol, 1,4-butanediol, 1,5-pentanediol, 2,2-dimethyl-1,3-propanediol, neopentyl glycol and 1,6-hexanediol. Ethylene glycol or 1,4-butanediol is typically used. The copolyesters are typically at least 50% amorphous, and may be completely amorphous (i.e., at least 90% amorphous by Differential Scanning calorimetry).

As noted previously, the copolyester may be dispersed in the heatseal layer along with the PLA polymer and/or may form part of the substrate, i.e., it may form a layer on the polymeric base layer.

Polymeric Base Layer

The polymeric base layer may comprise any film-forming polymer known in the art, provided that it is mechanically stronger than films made only from PLA homopolymers. Examples include, but are not limited to, polyester films, Nylon films, films made with polyethylene or ethylene copolymers, polypropylene films, and films made with toughened PLA materials.

In some embodiments of the invention, the polymeric base layer comprises a linear polyester layer, typically a biaxially oriented one. Typically the linear polyester will have an intrinsic viscosity from about 0.5 to about 0.8, with about 0.6 being most typical. Examples of polyester films include biaxially oriented polyethylene terephthalate (PET) film and biaxially oriented polyethylene naphthalate (PEN) film.

Especially useful is polyethylene terephthalate that has been biaxially oriented and heatset. Such a material is well known in the art, and is described for example in U.S. Pat. No. 4,375,494 to Stokes, incorporated herein by reference.

Polyethylene terephthalate polymer preparation techniques are well known to those skilled in the art and are disclosed in many texts, such as Encyclopedia of Polymer Science and Engineering, 2nd. Ed., Vol. 12, Wiley, N.Y., pp. 1-313. The polymer is typically obtained by condensing the appropriate dicarboxylic acid or its lower alkyl diester with ethylene glycol. Polyethylene terephthalate is formed from terephthalic acid or an ester thereof, and polyethylene naphthalate is formed from 2,6-naphthalene dicarboxylic acid or an ester thereof.

In the case where a coextruded two-layer polyester/copolyester film is used as the substrate on which the PLA polymer is coated, the two-layer film composite may be conveniently made by a process that includes multiple extrusion through a multiple orifice die or coextrusion of the composite layers, e.g. broadly as described in U.S. Pat. No. 3,871,947, followed by molecular orientation by stretching in one or more directions and heat setting. A convenient process and apparatus for coextrusion, known as single channel coextrusion, is described in U.S. Pat. No. 4,165,210 and GB patent specification No. 1,115,007. The method comprises simultaneously extruding streams of the first and second polyesters from two different extruders, uniting the two streams in a tube leading to a manifold of an extrusion die, and extruding the two polyesters together through the die under conditions of streamline flow so that the two polyesters occupy distinct regions of the flow without intermixing, whereby a film composite is produced.

Biaxial orientation of the polyethylene terephthalate portion of the film composite may be accomplished by stretching the composite in sequence in two mutually perpendicular directions typically at temperatures in the range of about 78 to 125° C. Generally, the conditions applied for stretching the composite may function to partially crystallize the first thermal bonding layer, and in such cases it is preferred to heat set the film composite under dimensional restraint at a temperature greater than the crystalline melting temperature of the first thermal bonding layer, but lower than the crystalline melting temperature of the polyethylene terephthalate portion. The composite is then permitted or caused to cool, rendering the first thermal bonding layer essentially amorphous while high crystallinity is maintained in the PET portion. Therefore, the stretching operation is preferably followed by heat setting under dimensional restraint, typically at a temperature in the range 150 to 250° C. Convenient processes for stretching and heat setting are described in U.S. Pat. No. 3,107,139. Coextruded film composites of the sort described here, incorporating a polyester base layer a copolyester layer on the base layer, are commercially available from DuPont Teijin Films of Wilmington, Del. under the name MELINEX® 301H. As noted above, these may be coated with a PLA polymer according to the invention, either with or without an additional copolyester included in the PLA coating formulation.

Preparing the Multilayer Sealant Film

Multilayer films according to the invention may be made by coating the polymeric substrate with a solution of a PLA polymer (optionally also containing an adhesion promoter) in a solvent. As used in this context, the term "solvent" means a volatile carrier for one or both of the PLA polymer and the adhesion promoter and the resulting mixture may be an emulsion, microemulsion, or other dispersion, and may also be a true solution in the strict sense. Suitable solvents include but not limited to water, tetrahydrofuran, methyl ethyl ketone, toluene, etc. When water is used as the solvent, an emulsifier may be used to make an emulsion or microemulsion.

If a PLA polymer is used alone, the side of the substrate upon which it is coated must have an adhesion promoter layer on it. For example, a coextruded multi-layer (typically two-layer) polyester/copolyester film may be used, although a polyester film bearing a solvent-coated copolyester layer may also be used. In either case, the PLA polymer may then be coated onto the substrate to provide the multilayer film.

Coating may be performed by any method known in the art, including for example reverse metering and gravure. The inventor has found that, by using a solution coating process, it is possible to prepare multilayer films having relatively thin heatseal layers (e.g., 0.5-20 microns). Such relatively thin layers are often difficult to obtain by other methods such as extrusion or coextrusion coating. Thus, the invention makes available multilayer films with high area to weight ratio vs. structures made by other processes such as lamination or extrusion coating. Also, a thinner heatseal layer may also provide a more easily removable (peelable) seal, which can be an advantage in some applications, such as sealing packaged food containers.

Uses of the Multilayer Sealant Film

As noted above, the films of this invention may be of particular use as lidding films for containers in sealing containers such as PLA trays. Typically, such trays or other vessels will be made from polylactic acid homopolymer, but copolymers of lactic acid with comonomers (including, but not limited to, those mentioned hereinabove with respect to the PLA polymer used in the heatseal layer) may also be used according to the invention. However, other kinds of containers may also be sealed with these films, and such uses are also contemplated according to the invention. Essentially any vessel having an opening may be sealed with a multilayer film according to the invention on the side of the film bearing the heatseal layer.

EXAMPLES

Sample Testing

The following test methods were used in the examples that follow:

(i) Heatseal strength to a tray is measured as follows. The film is sealed, by means of the heatseal layer, to a sheet of PLA tray-making stock on a heatseal machine at 200° F. at a pressure of 35 psi for 0.5 second. Strips (25 mm wide) of the sealed film and tray are cut out at 90° to the seal, and the load required to pull the seal apart is measured using an Instron operating at a crosshead speed of 0.25 mmin$^{-1}$. The procedure is generally repeated 4 times, and a mean value of 5 results calculated.

(ii) Heatseal strength of the composite film to itself to itself is measured by positioning together and heating the heatseal layers of two samples of the film at 230° F. for 0.5 second under a pressure of 35 psi. The sealed film is cooled to room temperature, and the sealed composite cut into 25 mm wide strips. The heatseal strength is determined by measuring the force required under linear tension per unit width of seal to peel the layers of the film apart at a constant speed of 0.25 mmin$^{-1}$.

(iii) The crystallinity percentage can be measured by Differential Scanning calorimetry. A 5 mg sample taken from the film is heated from 0 to 300° C. at 80° C./minute on a Perkin Elmer DSC7B differential scanning calorimeter. The crystallinity percentage assumes that crystallinity is present in all the samples.

Preparation of Samples

Preparation of coating solution #1: 99 g of PLA 4060D (a low crystallinity D,L-polylactic acid polymer purchased from NatureWorks LLC of Minnetonka, Minn.), 0.5 g of KEMAMIDE E antiblocking agent (purchased from Witco) and SYLOID 244 slip agent (purchased from W. R. Grace) were added to 500 g of tetrahydrofuran (THF). The mixture was stirred for 30 minutes to make coating solution #1.

Preparation of coating solution #2: 69 g of PLA 4060D, 30 g of a copolyester of azelaic acid/terephthalic acid/ethylene glycol (45/55/100 mol equivalents), 0.5 g of KEMAMIDE E and 0.5 g/SYLOID 244 were added to 400 g of THF. The mixture was stirred for 30 minutes to make coating solution #2.

Sample 1: Coating solution #1 was coated onto 92 gauge MYLAR E film (biaxially oriented polyethylene terephthalate film, made by DuPont Teijin Films) by a forward roll coating process. The roll gap was adjusted to achieve a dry coat weight of 8 g/m$^2$. The wet coating was dried at 100° C. for one minute.

Sample 2: Coating solution #1 was coated on MYLAR 100OL film (biaxially oriented polyethylene terephthalate film bearing a copolyester layer, made by DuPont Teijin Films) by a forward roll coating process. The roll gap was adjusted to achieve a dry coat weight of 8 g/m$^2$. The wet coating was dried at 100° C. for one minute.

Sample 3: Coating solution #2 was coated onto 92 gauge MYLAR E film made by DuPont Teijin Films by a forward roll coating process. The roll gap was adjusted to achieve a dry coat weight of 8 g/m$^2$. The wet coating was dried at 100° C. for one minute.

Sample 4: Coating solution #2 was coated on MYLAR 100OL made by DuPont Teijin Films by a forward roll coating process. The roll gap was adjusted to achieve a dry coat weight of 8 g/m$^2$. The wet coating was dried at 100° C. for one minute.

The films prepared in Samples 1-4 were heat sealed to PLA tray-making stock and to themselves according to methods (i) and (ii) above, respectively. The resulting heatseal strengths are shown in the following table, reported in g/in.

|  | Sample 1 | Sample 2 | Sample 3 | Sample 4 |
|---|---|---|---|---|
| Method (i)* | <100 | 450 | 475 | 850 |
| Method (ii) | <200 | 420 | 320 | 600 |

*Seal was initiated by hand before the sample was peeled by Instron

A comparison of Samples 1 and 2 shows that a heatseal layer containing only PLA had better heatseal performance on a base film bearing an intermediate layer of copolyester (Sample 2) than on a base film without an intermediate copolyester layer (Sample 1). Further, comparing Samples 1 and 3, it is seen that in the absence of an intermediate copolyester layer, the addition of a copolyester to the PLA heatseal layer (Sample 3) gave better heatseal strength than a heatseal layer containing only PLA (Sample 1). Finally, comparing Sample 4 with either Sample 2 or Sample 3, it is seen that including copolyester in the PLA heatseal layer and also as an intermediate layer gave better performance than either one by itself.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A method of making a multilayer film, comprising the steps of
   a) applying a coating liquid to a substrate comprising a polymeric base layer and an adhesion promoter in a layer on a surface of the polymeric base layer to receive the coating liquid, the coating liquid consisting of a solvent, a PLA polymer, and optionally one or more of an antifog agent, a slip additive, an antioxidant, inorganic particles and dispersed adhesion promoter; and
   b) removing the solvent to form a heatseal layer comprising the PLA polymer;
   wherein the adhesion promoter is a copolyester resin consisting of units of one or more glycols, at least one aliphatic dicarboxylic acid of the formula $C_nH_{2n}(COOH)_2$ wherein n is 2 to 8, and at least one aromatic dicarboxylic acid selected from the group consisting of terephthalic acid, isophthalic acid, phthalic acid, 2,5-naphthalenedicarboxylic acid, 2,6-naphthalenedicarboxylic acid and 2,7-naphthalenedicarboxylic acid.

2. The method of claim 1, wherein the polymeric base layer comprises a polyethylene terephthalate layer.

3. The method of claim 2, wherein the polymeric base layer comprises a biaxially oriented polyethylene terephthalate layer.

4. The method of claim 1, wherein the heatseal layer is in a range of 0.5 to 20 microns thick.

5. The method of claim 1, wherein the heatseal layer is in a range of 2.0 to 10 microns thick.

6. The method of claim 1, wherein the copolyester resin is a heat sealable copolyester resin.

7. The method of claim 1, wherein the PLA polymer is at most 50% crystalline.

8. The method of claim 1, wherein the PLA polymer is amorphous.

9. The method of claim 1, wherein the PLA polymer is a PLA homopolymer or copolymer.

10. The method of claim 1, wherein the coating liquid further comprises an antifog agent.

11. The method of claim 1, further comprising after step b) a step c) of applying an antifog agent to the heatseal layer.

12. A multilayer film prepared by the method of claim 1, wherein the copolyester resin is formed by a process consisting of condensation or ester interchange.

13. A coating composition for coating a film substrate comprising a polymeric base layer to produce a multilayer film for use in sealing a vessel;
   wherein the composition comprises a PLA polymer;
   a copolyester resin consisting of units of one or more glycols, at least one aliphatic dicarboxylic acid of the formula $C_nH_{2n}(COOH)_2$ wherein n is 2 to 8, and at least one aromatic dicarboxylic acid selected from the group consisting of terephthalic acid, isophthalic acid, phthalic acid, 2,5-naphthalenedicarboxylic acid, 2,6-naphthalenedicarboxylic acid and 2,7-naphthalenedicarboxylic acid; and
   a solvent.

14. The coating composition of claim 13, wherein the amount of copolyester resin is in a range of 10 to 90 wt % of the combined weight of the copolyester resin and the PLA polymer.

15. A method of making a multilayer film, comprising the steps of
   a) applying a coating liquid to a substrate comprising a polymeric base layer and an adhesion promoter in a layer on a surface of the polymeric base layer to receive the coating liquid, the coating liquid comprising a solvent and a PLA polymer; and
   b) removing the solvent to form a heatseal layer comprising the PLA polymer;
   wherein the adhesion promoter is a copolyester resin consisting of units of one or more glycols selected from the group consisting of ethylene glycol, diethylene glycol, triethylene glycol, propylene glycol, 1,3-butanediol, 1,4-butanediol, 1,5-pentanediol, 2,2-dimethyl-1,3-propanediol, neopentyl glycol and 1,6-hexanediol; at least one aliphatic dicarboxylic acid of the formula $C_nH_{2n}(COOH)_2$ wherein n is 2 to 8; and at least one aromatic dicarboxylic acid selected from the group consisting of terephthalic acid, isophthalic acid, phthalic acid, 2,5-naphthalenedicarboxylic acid, 2,6-naphthalenedicarboxylic acid and 2,7-naphthalenedicarboxylic acid.

16. A multilayer film comprising
   a) a substrate comprising a polymeric base layer and an adhesion promoter layer on a surface of the polymeric base layer; and
   b) on the adhesion promoter layer of the substrate, a heatseal layer consisting of a PLA polymer and optionally one or more of an antifog agent, a slip additive, an antioxidant, inorganic particles and dispersed adhesion promoter;
   wherein the adhesion promoter is a copolyester resin formed by a process consisting of condensation or ester interchange and consists of units of one or more glycols, at least one aliphatic dicarboxylic acid of the formula $C_nH_{2n}(COOH)_2$ wherein n is 2 to 8, and at least one aromatic dicarboxylic acid selected from the group consisting of terephthalic acid, isophthalic acid, phthalic acid, 2,5-naphthalenedicarboxylic acid, 2,6-naphthalenedicarboxylic acid and 2,7-naphthalenedicarboxylic acid; and
   wherein the polymeric base layer comprises a biaxially oriented polyester.

17. The multilayer film of claim 16, wherein the polymeric base layer comprises polyethylene terephthalate.

18. The multilayer film of claim 16, comprising said dispersed adhesion promoter wherein the amount of copolyester resin is in a range of 10 to 90 wt % of the combined weight of the copolyester resin and the PLA polymer.

19. The multilayer film of claim 16, wherein the heatseal layer is in a range of 0.5 to 20 microns thick.

20. The multilayer film of claim 16, wherein the heatseal layer is in a range of 2.0 to 10 microns thick.

21. The multilayer film of claim 16, wherein the PLA polymer is a PLA homopolymer or copolymer.

22. The multilayer film of claim 16, wherein the PLA polymer is at most 50% crystalline.

23. The multilayer film of claim 16, wherein the PLA polymer is amorphous.

24. The multilayer film of claim 16, further comprising an antifog agent dispersed within the heatseal layer or on a surface of the heatseal layer opposite the substrate.

25. A sealed container comprising a vessel having an opening, wherein the opening is sealed with a multilayer film of claim 16 on the side of the film bearing the heatseal layer.

26. The sealed container of claim 25, wherein the vessel is formed from polylactic acid homopolymer or copolymer.

* * * * *